(12) United States Patent
Molchanov (10) Patent No.: US 12,546,887 B2
(45) Date of Patent: Feb. 10, 2026

(54) MONOPULSE SYNTHETIC APERTURE RADAR

(71) Applicant: Pavlo Anatoliyovich Molchanov, Las Cruces, NM (US)

(72) Inventor: Pavlo Anatoliyovich Molchanov, Las Cruces, NM (US)

(*) Notice: Subject to any disclaimer, the term of this patent is extended or adjusted under 35 U.S.C. 154(b) by 357 days.

(21) Appl. No.: 17/699,129

(22) Filed: Mar. 20, 2022

(65) Prior Publication Data

US 2023/0296760 A1    Sep. 21, 2023

(51) Int. Cl.
*G01S 13/90*    (2006.01)
*G01S 7/282*    (2006.01)

(52) U.S. Cl.
CPC .......... *G01S 13/9021* (2019.05); *G01S 7/282* (2013.01); *G01S 13/9005* (2013.01)

(58) Field of Classification Search
CPC .. G01S 13/9021; G01S 7/282; G01S 13/9005; G01S 13/9092; G01S 3/90; G01S 13/9023; G01S 13/9029; G01S 13/56; G01S 13/878; G01S 13/44; G01S 13/4436; G01S 13/4445; G01S 13/4454; G01S 13/4472; G01S 13/449; G01S 13/4481; G01S 2007/356; G01S 7/41; G01S 7/414
USPC ............................ 342/375, 25 R, 61; 364/454
See application file for complete search history.

(56) References Cited

U.S. PATENT DOCUMENTS

| | | | | |
|---|---|---|---|---|
| 4,387,373 | A | * | 6/1983 | Longuemare, Jr. .......................... G01S 13/9092 342/149 |
| 5,818,383 | A | * | 10/1998 | Stockburger ............ G01S 7/415 342/161 |
| 6,400,306 | B1 | * | 6/2002 | Nohara ............... G01S 13/9029 342/25 R |

OTHER PUBLICATIONS

Ender, J. H. G., Gierull, C. H., & Cerutti-Maori, D. (2008). Improved Space-Based Moving Target Indication via Alternate Transmission and Receiver Switching. IEEE Transactions on Geoscience and Remote Sensing, 46(12), 3960-3974. https://doi.org/10.1109/TGRS.2008.2002266 (Year: 2008).*

* cited by examiner

*Primary Examiner* — Vladimir Magloire
*Assistant Examiner* — Remash R Guyah (57) ABSTRACT

Monopulse synthetic aperture radar for fast, high-resolution imaging of ground and/or airborne objects consists of set of non-scanning transmitting and receiving antennas with overlap antenna patterns positioned in quadrature or multi-axis directions and covering wide space sector, wherein each receiving antenna is coupled to monopulse processor and separate receiver chain coupled with digital multi-channel processor. Application of monopulse and digital multi-axis multi-channel processing of all signals in receiving chains provides simultaneous fast signal processing from all space sectors. The monopulse method combined with multi-channel digital processing, where amplitudes, phase, and frequency components shift of receiving signals processing relative to signals in overlap receiving antenna beams pro- (Continued)

vides 3-5 times higher imaging resolution and allows to suppression influence of media and clutter. An array of directional antennas may be arranged for multi-frequency, multi-mode regimes.

9 Claims, 12 Drawing Sheets

MONOPULSE SYNTHETIC APERTURE RADAR

REFERENCES CITED

US Patent Documents

| | | |
|---|---|---|
| U.S. Pat. No. 11,061,114 B2 | July 2021 | Stephen A. Harman |
| U.S. Pat. No. 10,877,130 B2 | December 2020 | Stephen A. Harman |
| U.S. Pat. No. 10,288,729 B2 | May 2019 | Armin W. Doerry |
| U.S. Pat. No. 6,911,932 B1 | June 2005 | Armin W. Doerry |
| U.S. Pat. No. 0,035,783 A1 | February 2014 | Pavlo A. Molchanov 342/357.59 |
| 4,257,047 | April 1981 | Stephen E. Lipsky 343/120 |
| 3,906,505 | September 1975 | Stephen E. Lipsky 343/119 |

OTHER PUBLICATIONS

1. Stephen Harman, "Holographic Radar Development", Microwave Journal, Aveillant Ltd., Cambridge, UK, February 2021.
2. Armin W. Doerry, "Single-Axis Three-Beam Amplitude. Monopulse Antenna—Signal Processing Issues", Sandia National Laboratories, Technical Report•May 2015.
3. Stephen E. Lipsky, "Microwave Passive Direction Finder", SciTech Publishing Inc. Raleigh, NC 27613, 2004.
4. Pavlo A. Molchanov, Ashok Gorwara, "Fly Eye Radar Concept". IRS2017. International Radar Symposium, Prague, July 2017.

PRIOR ART

Figure 1:
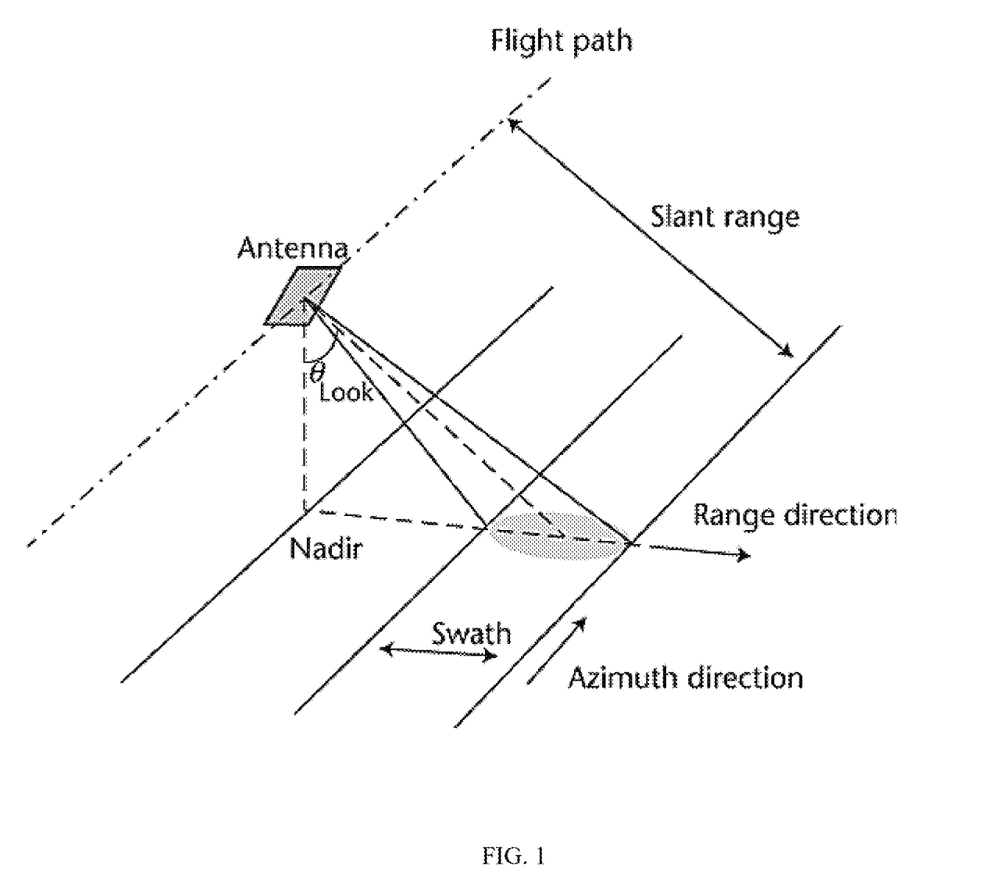
FIG. 1 diagrammatically illustrates the real aperture radar principle.

The spatial resolution of imaging radar is determined by the size of the antenna, pulse duration, and antenna beamwidth (FIG. 1). Scanning a beam with a smaller wavelength and beamwidth allows for enhanced image resolution. Still, it increases the time of signal processing and decreases wave penetration. SAR with a lower frequency and a wide beam can provide a larger image footprint and faster image processing without scanning or switching, but with worse resolution. The monopulse method with application reference beams can help to solve this problem.

Figure 2A:
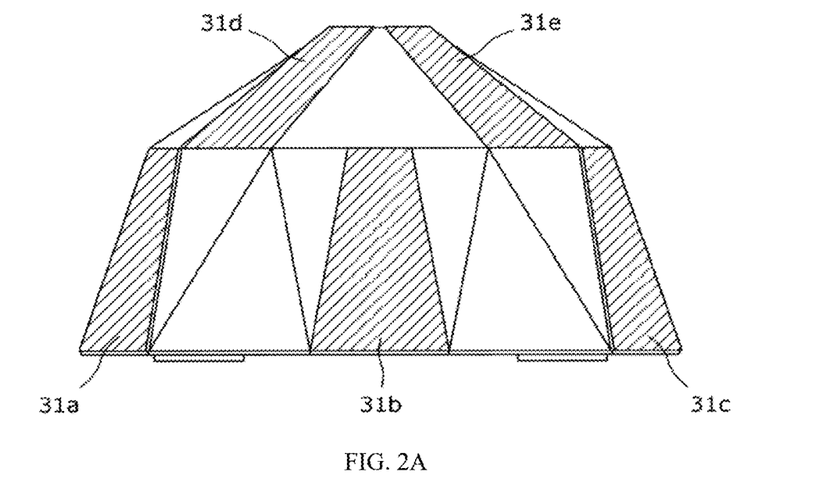
Figure 2B:
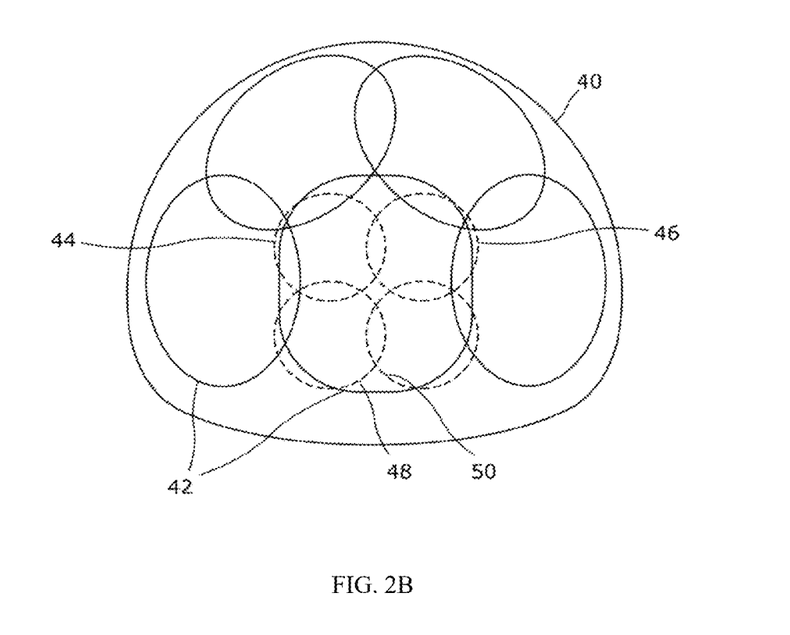

Non-scanning radar system for the detection of incoming munitions was proposed by Stephen A. Harman [1]. The staring antenna array and beam covering are presented in FIG. 2. The Application of 360-degree staring radars instead of scanning radars for fast drone detection provides a wider area of observation and holographic technology with beamforming of receiving signals, decreasing the time of processing.

Armin W. Doerry showed that radar resolution can be increased by the application of a few (two-three) antennas with overlapping antenna patterns [2]. Maximizing the accuracy and precision calculation of the direction of arrival related to space tilt between directional antennas with overlapping antenna patterns. The optimum space tilt angles can be readily calculated from constituent antenna patterns and the direction of arrival interval.

Lipsky S. E. in U.S. Pat. No. 4,257,047 (1981) proposed an antenna array of a plurality of fixed, narrow beamwidth antennas, geographically oriented to provide omnidirectional coverage, as a set of antennas is selected. It presents an explanation of the monopulse method for microwave direction finding with two pairs of directional antennas, positioned by azimuth and elevation boresight [3]. Direction finding by way of amplitude comparison methods can provide a root mean square (RMS) accuracy smaller than 2° in 100 ns after a direct wave arrives. High-accuracy phase measurements provide high accuracy and fast direction finding. However, most importantly, the monopulse method does not require a long time, from milliseconds for small amount operations to tens of seconds for FFT (Fast Fourier Transform), computer calculations, and can provide critical information about target position, speed, and identity.

An array of directional antennas with overlapping antenna patterns and multi-channel signal processing provides higher direction-finding accuracy, which means better imaging resolution and faster signal processing [4].

BACKGROUND OF THE INVENTION

The present invention is related to a radar system adapted for specific applications for mapping or imaging using synthetic aperture techniques, e.g., synthetic aperture radar (SAR) techniques combined with monopulse techniques. More particularly, the present invention relates to synthetic aperture imaging radar applying a monopulse method for simultaneous processing of analog signals and multichannel processing of digitized signals. Modular radar with non-scanning, non-switching simultaneous lobing, using multiple overlap beams. Image generation is based on analog and digital processing of reflected amplitudes, phases, and spectrum components associated with the scattering and movement parameters of objects.

Ana Martines, Armin W. Doerry in U.S. Pat. No. 6,911,932 B1 from Jun. 28, 2005 "Two antennae, two passes interferometric synthetic aperture radar" proposed a multi-antenna, multi-pass IFSAR (interferometric synthetic aperture radar) mode utilizing data-driven alignment of multiple independent passes can combine the scaling accuracy of a two-antenna, one-pass IFSAR mode with the height-noise performance of a one-antenna, two-pass IFSAR mode. A two-antenna, two-pass IFSAR model can accurately estimate the larger antenna baseline from the data itself and reduce height noise, allowing for more accurate information about target ground position locations and heights. The two-antenna, two-pass IFSAR mode can use coarser IFSAR data to estimate the larger antenna baseline. Multi-pass IFSAR can be extended to more than two (2) passes, thereby allowing true three-dimensional radar imaging from stand-off aircraft and satellite platforms. IFSAR utilizes at least two (2) SAR images of the same scene, formed at slightly different elevation angles relative to each other, to extract information about target heights. Such images can be coherently combined to ascertain the topography of the imaged area and produce three-dimensional maps of the imaged area.

The second antenna allows a more accurate estimate of the larger antenna baseline from the data itself and reduces height noise, allowing for more accurate information about target ground position locations and heights. But the proposed radar system requires two antennas with separate carriers, which is not always possible.

Armin W. Doerry in the patent "Apodization of spurs in radar receivers using multi-channel processing" from May 14, 2019, proposed various technologies related to the identification and mitigation of spurious energies or signals in radar imaging. Spurious energy in received radar data can be a consequence of non-ideal components and circuit behavior. Such behavior can result from I/Q imbalance, nonlinear component behavior, additive interference (e.g., crosstalk, etc.), etc. The manifestation of the spurious energy in a radar image (e.g., a range-Doppler map) can be influenced by appropriate pulse-to-pulse phase modulation. Comparing multiple images that have been processed using the same data but of different signal paths and modulations enables the identification of undesired spurs, with subsequent cropping or apodization of the undesired spurs from a radar image. Spurs can be identified by comparison with threshold energy. Removal of an undesired spur enables enhanced identification of true targets in a radar image. The proposed radar system is composed of a plurality of components, whereby the components can exhibit some degree of non-ideal behavior, which can influence the purity or quality of a signal being processed by the radar system. Such components often exhibit non-linear behavior and/or other imbalances. In range-Doppler radar data, the effects of the non-linear behavior can be manifested as spurious signals, also known as "spurs". The spurs can lead to false indications of a target energy, thereby reducing the performance, accuracy, reliability, and/or general utility of the radar system. By applying a received input signal to two signal paths, whereby each signal path utilizes a different modulation, two radar images may be generated. Both radar images can include identical true target responses but have different spurious energy responses.

Multi-channel processing radar systems can provide a shorter processing time and more possibilities with reference signals for clutter suppression and spur apodization but have limitations for detecting objects moving with very slow or hypersonic velocity.

Stephen Anthony Harman in his patens from Jul. 13, 2021, U.S. Pat. No. 11,061,114 B2 "Radar system for the detection of drones" and patent from December 2020 U.S. Pat. No. 10,877,130 "Drone detection radar" proposed a radar system for the detection of drones, including a transmitter, a receiver and a processor, wherein the processor is arranged to process demodulated return signals in a first process using a Doppler frequency filter, and to store locations of any detections therefrom, and to process the demodulated signals in a second process to look for signal returns indicative of a preliminary target having a rotational element at a location, and should a detection be found in the second process, to then attempt to match a location of the preliminary target with returns from the first process, and to provide a confirmed detection if a location of detection from the first process matches with the location of detection from the second process. A drone detection radar can include a plurality of antenna systems, each antenna system being arranged to transmit a signal into an associated sector and to receive signals reflected from targets in the sector, the sectors collectively forming a monitored volume, and wherein a subset of the antenna systems are active at any one time, with the active sub-set of antenna systems being arranged to monitor their respective volumes for a duration sufficient to measure Doppler signals associated with slow-moving drones, with the radar being arranged to switch to a different sub-set of antenna systems after each duration, such that the whole volume is monitored within a predetermined period. Combining a staring array from an antenna system with a plurality of switched antenna systems allows drones to be both detected and tracked, with an appropriate selection of the predetermined period.

However, this radar system cannot provide good enough image resolution because of long wavelength wide antenna patterns.

SUMMARY OF THE INVENTION

An objective of the present invention is the development of monopulse synthetic aperture radar for fast, high-resolution imaging of ground and/or airborne objects. The radar consists set of non-scanning transmitting and receiving antennas with overlapping antenna patterns wherein antennas are positioned in quadrature or multi-axis directions and covering a wide space sector. Each receiving antenna is coupled with a separate receiver chain and multi-channel processor. Simultaneous application of monopulse and digital multi-axis multi-channel processing of all signals in receiving chains provides fast signal processing from the whole space sector. The monopulse method, where amplitudes, phase, and frequency components shift of receiving signals processing relative to signals in overlapping receiving antenna beams will provide higher imaging resolution and allow for the suppression influence of medium and clutter.

Monopulse synthetic aperture radar for fast, high-resolution imaging of ground and/or airborne objects comprising transmitting and receiving non-scanning means arranged as monopulse transceiver modules wherein each monopulse transceiver module covers at a minimum one said space sector. Each monopulse transceiver module consists monopulse processor and at minimum one transmitter connected to as minimum one transmitting antenna covering said space sector and a set of non-scanning receiving antennas with overlap antenna patterns in quadrature or multi-axis directions and covering the same space sector, wherein each receiving antenna coupled to separate receiver chain. Each receiver chain is coupled to a monopulse processor for simultaneous (monopulse) multi-axis processing of all signals in receiving chains in reference to amplitudes, phase, and frequency components shift of signals in receiving antennas with overlap patterns. Outputs of monopulse processor and receiver chains connected to image generator by digital interface. Image generator consists of quadrature or multi-axis multi-channel processor for simultaneous processing of all signals in receiving chains including amplitude, phase and frequency components shift of signals in receiving antennas and generating image. All transmitters, receiver chains, and processing means are connected with synchronization means. Transceiver modules, image generator and radar output chain connected by microwave and/or fiber optic digital interface.

The transceiver module of the proposed monopulse synthetic aperture radar may be positioned on UAS or other airborne or ground carriers or multiple monopulse transceiver modules may be distributed around the carrier, or multiple monopulse transceiver modules distributed between the swarm of carriers connected to radar communication network. Transmitting, receiving, and processing means may be arranged for simultaneous transmitting, receiving, and processing signals on a few different frequencies (multi-frequency signals) and consist of separate antennas and filters in each receiving and processing chain or can be arranged for simultaneous transmitting, receiving and processing different modes, such as communication, navigation, control (multi-mode signals) and consist separate antennas, filters, and processing means in each transmitter, receiving and processing chain.

BRIEF DESCRIPTION OF DRAWINGS

FIG. 2 shows a known radar antenna system (A) and antenna pattern distribution (B) for continuous tracking of multiple objects covering 360 degrees.

FIG. 3 diagrammatically illustrates the first embodiment of monopulse synthetic aperture radar (A), where a non-scanning quadrature antenna array with overlap antenna patterns covers the imaging space sector (B).

FIG. 4 diagrammatically illustrates two space-tilted antenna patterns of directional antennas in Cartesian coordinates (A), and an antenna pattern in polar coordinates (B) with two positions of the object relative to the center of the antenna pattern.

FIG. 12 A, B shows two models of monopulse sets of receiving directional antenna arrays for micro-UAS.

DETAILED DESCRIPTION OF THE INVENTION

Figure 3A:
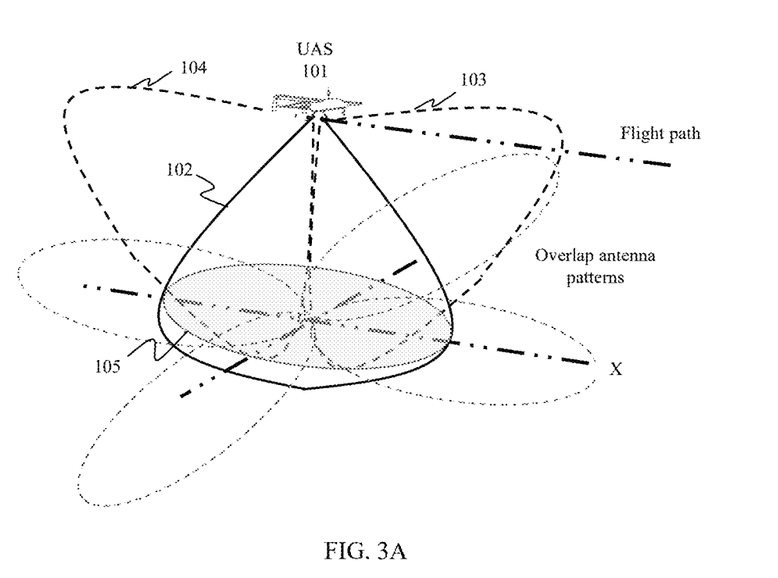
Figure 3B:
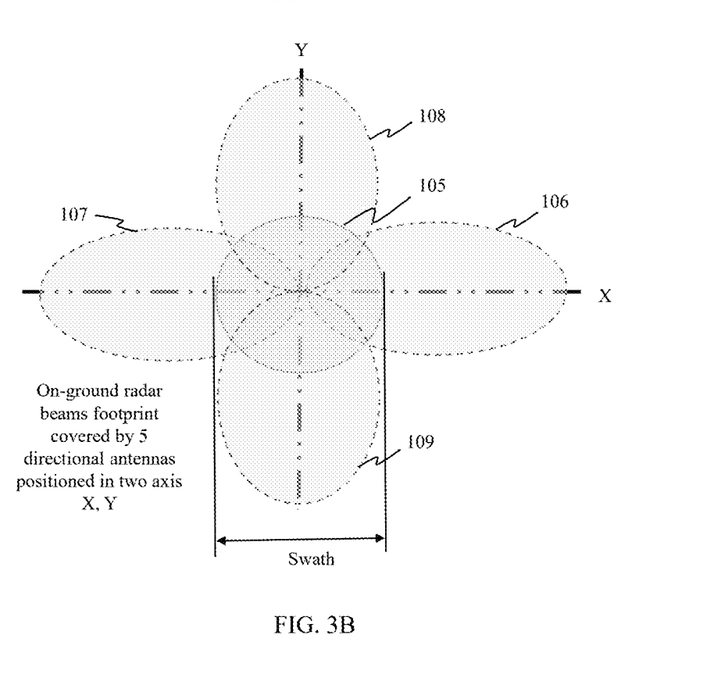

The first embodiment of monopulse synthetic aperture radar is diagrammatically illustrated in FIG. 3A. The non-scanning array of directional antennas is positioned in two directions X, and Y (quadrature directions) on UAS 101. Main beam 102 covers the central, imaging space sector (main beam). Antenna patterns 103, and 104 partially overlap main beam 102 and partially cover the imaging space sector in the X direction as shown in FIG. 3A Overlap antenna patterns in the Y direction are not shown in the picture. FIG. 3B shows on-ground overlap beam footprints. The main beam's footprint 105 is partially overlapped by footprints 106, and 107 in the X direction, which corresponds to antenna patterns 103, 104. Footprints 108 and 109 partially overlap the main beam's footprint in the Y direction.

Figure 4A:
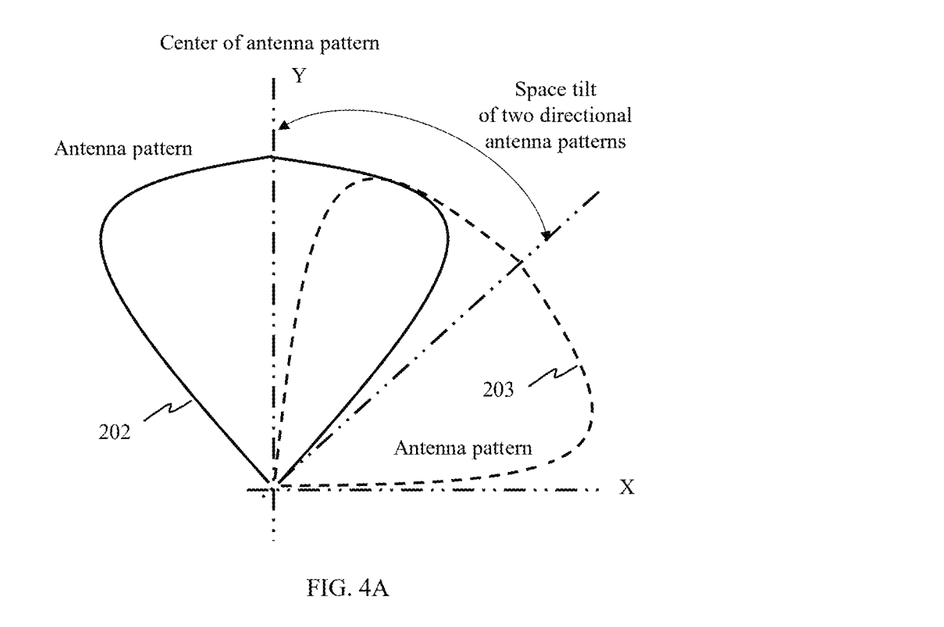
Figure 4B:
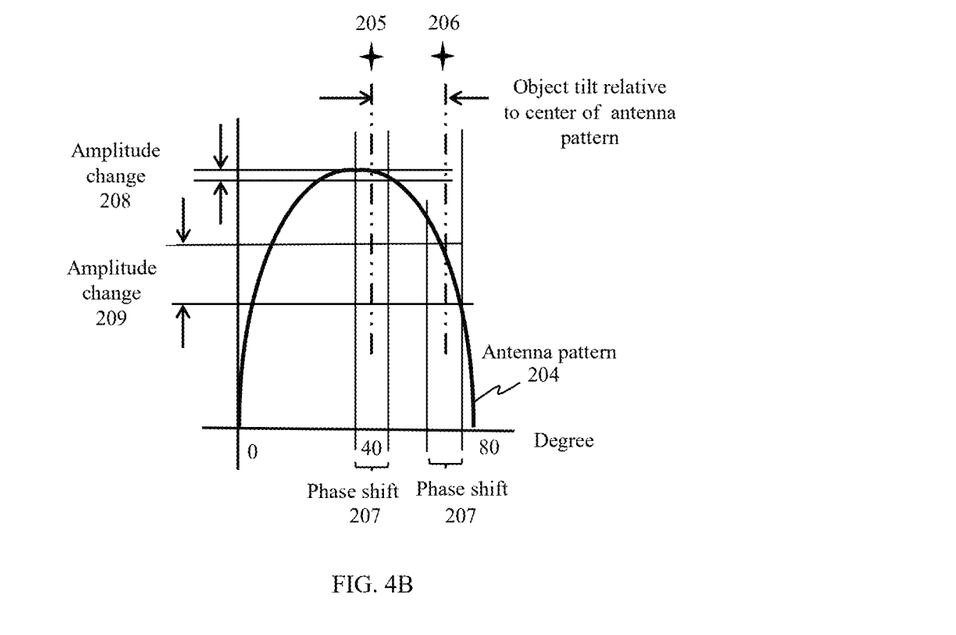

FIG. 4A diagrammatically illustrates two space-tilted directional antenna patterns in Cartesian X, Y coordinates, where main beam 202 partially overlaps antenna pattern 203, which space tilted relative to the center of the antenna pattern 202. FIG. 4B diagrammatically illustrates the antenna pattern of receiving directional antenna 204 in polar coordinates with two positions of detecting objects relative to the center of the antenna pattern 205 and 206. If an object is positioned close to the center of the antenna pattern (position 205), some receiving signal phase shift 207, which can be for example result of a change in distance to the object or a change in another object's parameters, lead to a corresponding change of signal amplitude 208. If the antenna tilted in space relative to the object, as shown in FIG. 4A, the object position will be changed to position 206, as shown in FIG. 4B. The same phase shift 207 (for example resulting in a change in distance to the object) will lead to change of signal amplitude 209. As followed from the picture, change of receiving signal amplitude will be 3-5 times larger for the same phase shift, if the antenna is tilted to some angle (for example 15-75 degrees, approx. 30 degrees optimal) relative to the imaging object because the antenna pattern slope. It means an array of directional antennas with overlap antenna patterns by antennas space tilt relative to the main antenna center can provide 3-5 times better image resolution if monopulse phase measurement is used. Radar resolution can be increased by the application of a few (two to three) antennas with overlapping antenna patterns. Maximizing the accuracy and precision calculation of direction of arrival related to space tilt between directional antennas with overlap antenna patterns. The optimum space tilt angles can be readily calculated from constituent antenna patterns and the direction of arrival interval.

Figure 5:
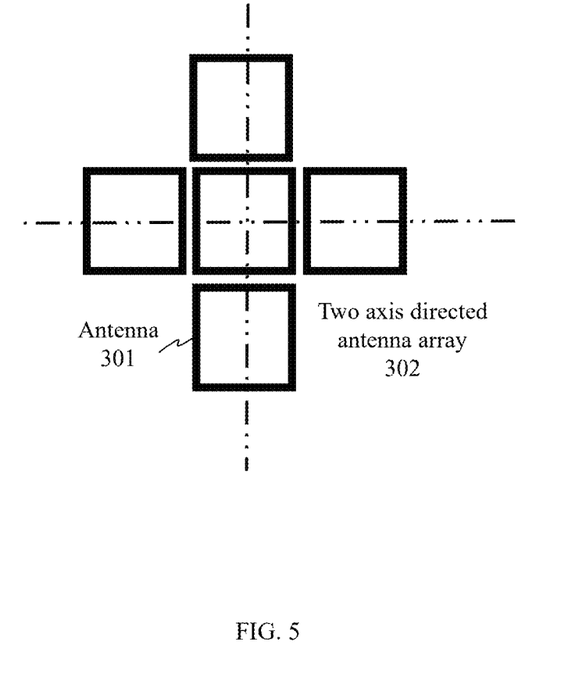
FIG. 5 shows the two-axis distribution of directional antennas within the transceiver module.
Figure 6:
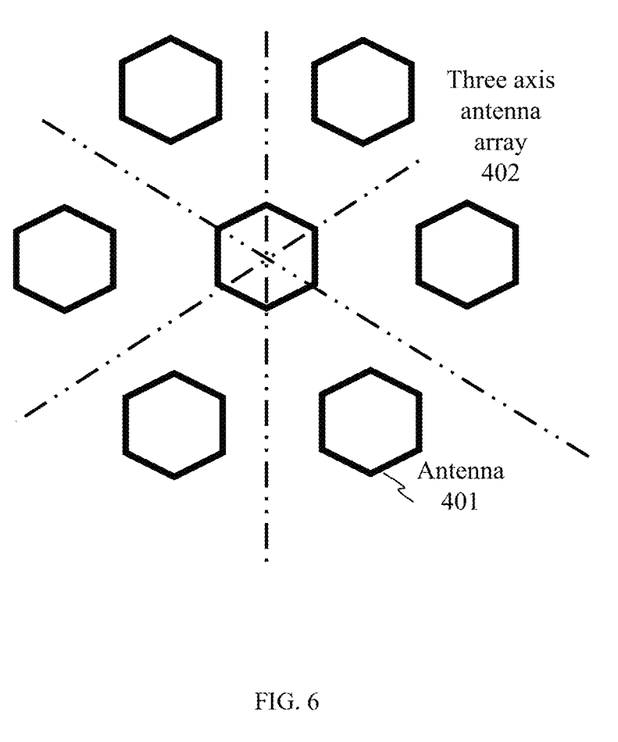
FIG. 6 shows the three-axis distribution of directional antennas within the transceiver module.

FIG. 5 shows the two-axis distribution of directional antennas 301 within the monopulse transceiver module. Such two-axis distribution 302 can create overlap antenna patterns presented in FIG. 3A, B. FIG. 6 shows the three-axis distribution of directional antennas 401 within the monopulse transceiver module.

Figure 7:
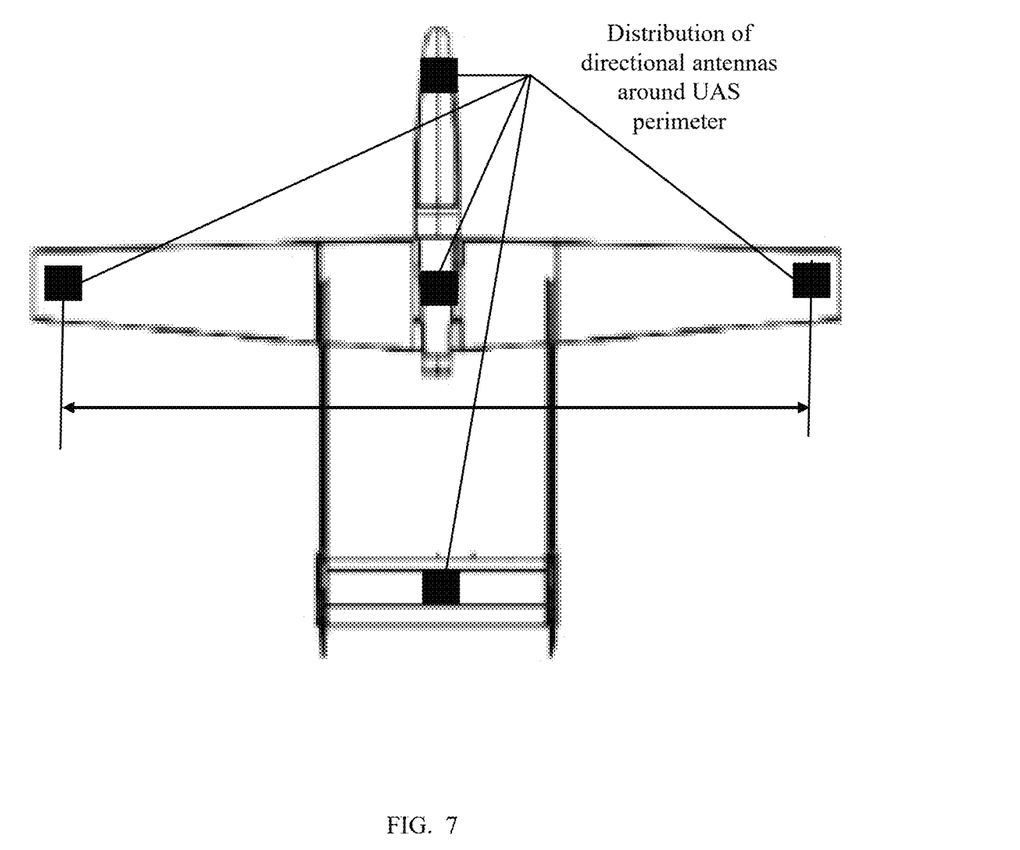
FIG. 7 shows the distribution of directional antennas around the UAS perimeter.
Figure 8:
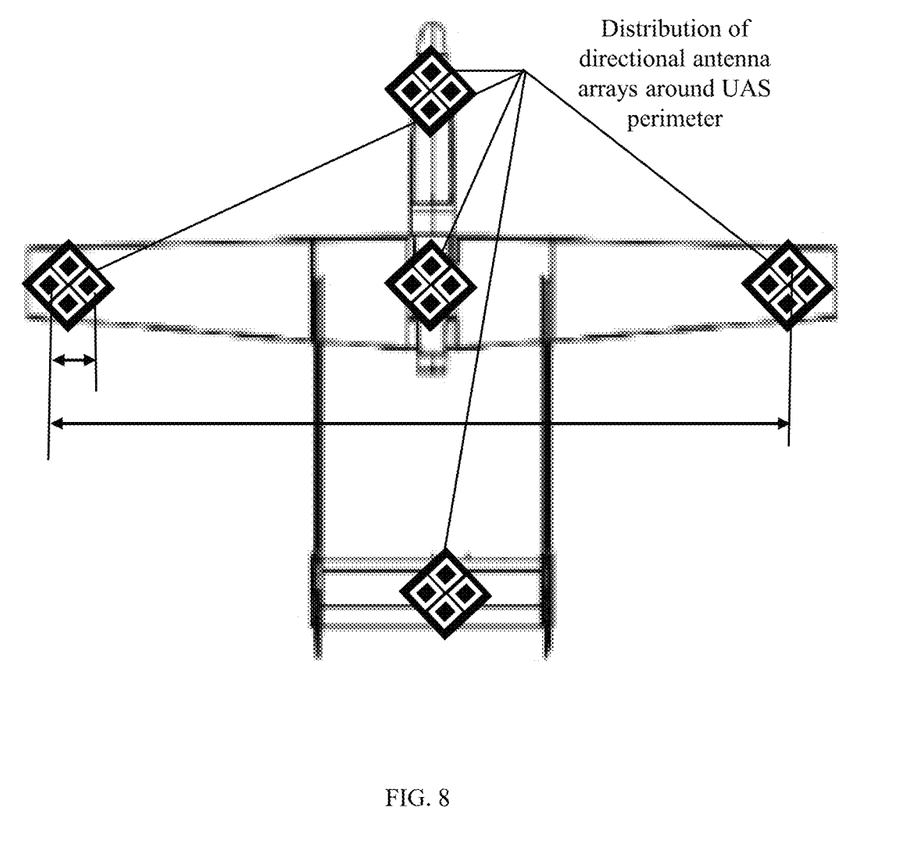
FIG. 8 shows the distribution of directional antenna arrays around the UAS perimeter.

Accuracy of phase measurement and corresponding increasing image resolution can be made by increasing the distance between radar receiving antennas. FIG. 7 shows the first embodiment of the distribution of directional antennas around the UAS perimeter. The second embodiment with the distribution of monopulse transceiver modules with directional antenna arrays around the UAS perimeter is presented in FIG. 8. Three receiving antennas positioned at different distances in one direction axis also allow for solving the phase ambiguity problem and provide high accuracy range measurement, which corresponds to better image range resolution.

Figure 9:
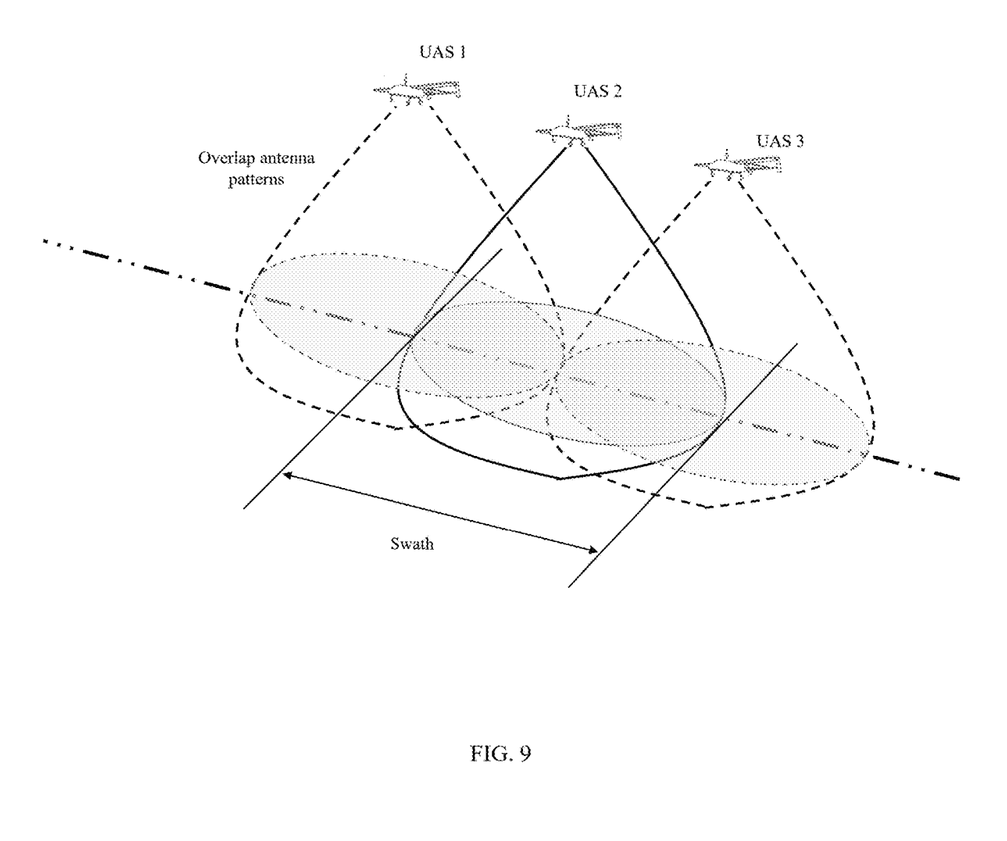
FIG. 9 shows the distribution of directional antennas between UAS swarms.

Monopulse transceiver modules can be distributed between the swarm of UAS, as shown in FIG. 9. Synchronization of all transmitting and receiving chains, digitizing of reflected from objects signals directly on antennas, and connection of radar modules to the network allow distribution of modules even when the distance between UAS with modules is variable.

Figure 10:
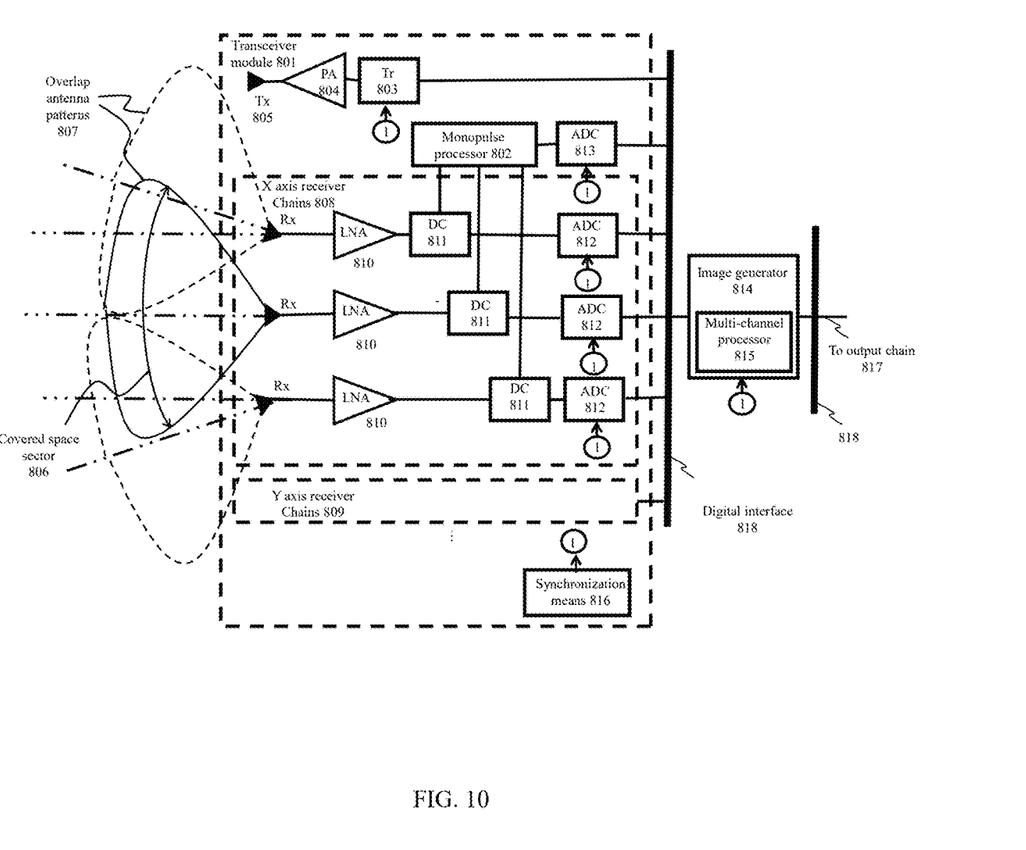
FIG. 10 represents the first embodiment of the block diagram of the transceiver module with a two-axis distribution of receiving antennas.

FIG. 10 represents the first embodiment of a block diagram of the two-axis distribution of receiving antennas within a separate transceiver module. Monopulse transceiver module 801 consists of monopulse processor 802 and transmitter 803 with power amplifier 804 connected to one transmitting antenna 805 covering said space sector 806. Set of non-scanning receiving antennas with overlap antenna patterns 807 in X direction 808 and Y direction 809 covering same space sector 806, wherein each of receiving antenna coupled to separate receiver chain consists low noise amplifier 810, direction coupler 811 and analog-to-digital converter 812. Each receiver chain is coupled to monopulse processor 802 by directional coupler 811 for simultaneous (monopulse) multi-axis processing of all signals in receiving chains in reference to amplitudes, phase, and frequency components shift of signals in receiving antennas with overlap patterns. Outputs of monopulse processor connected to analog-to-digital converter 813 and receiver chains 808, 809 connected to image generator 814 by digital interface 818. Image generator 814 consists of quadrature or multi-axis multi-channel processor 815 for simultaneous processing of all signals in receiving chains including amplitude, phase, and frequency components shift of signals in receiving antennas and generating an image. Transmitter 803, 804, receiver chains 808, 809 and processing means 813, 814 connected with synchronization means 816. Transceiver module 801, image generator 814, and radar output chain 817 are connected by microwave and/or fiber optic digital interfaces 818.

Figure 11A:
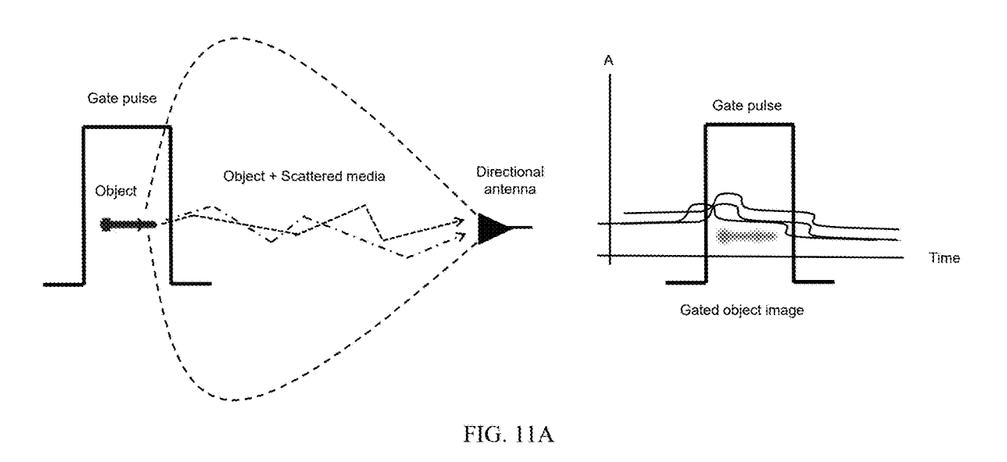
FIG. 11A, B shows advances of a set of non-scanning receiving antennas with overlap antenna patterns wherein one antenna is arranged as a reference for monopulse (one iteration) or/and adaptive (multiple iterations) signal processing.
Figure 11B:
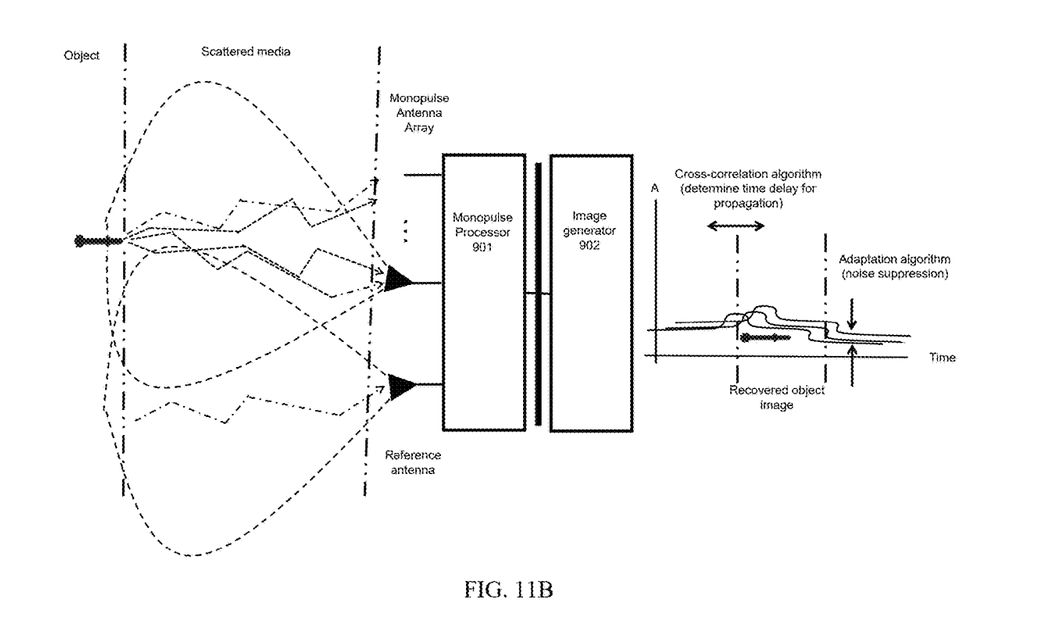

Regular radar systems with one antenna cannot separate reflected object signals from noisy media, even by using fast gating of received signals, as shown in FIG. 11A. For noisy media, one directional antenna of the set of non-scanning receiving antennas with overlap antenna patterns can be arranged as a reference for monopulse (one iteration) or/and adaptive (multiple iterations) signal processing as shown in FIG. 11B. Reference antenna provides the possibility to separate signals reflected from the imaging object and signals reflected from media between the object and the receiving antenna. Reference antenna also allows adjusting the time delay of reflected from object signals, for example, by an adaptation algorithm. It allows the enhancement of SNR (signal-noise ratio) and suppresses clutter.

Figure 12A:
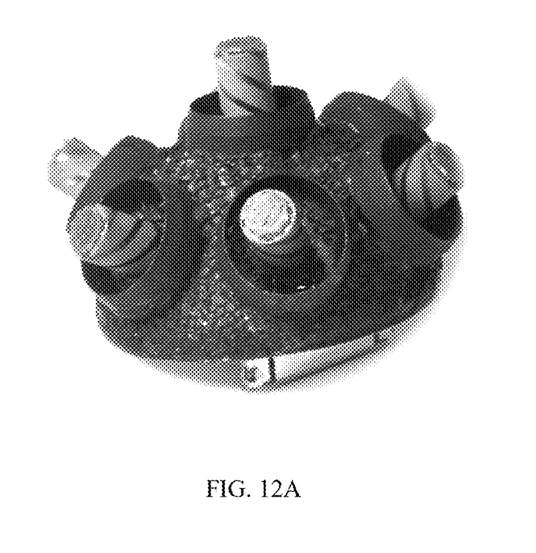
Figure 12B:
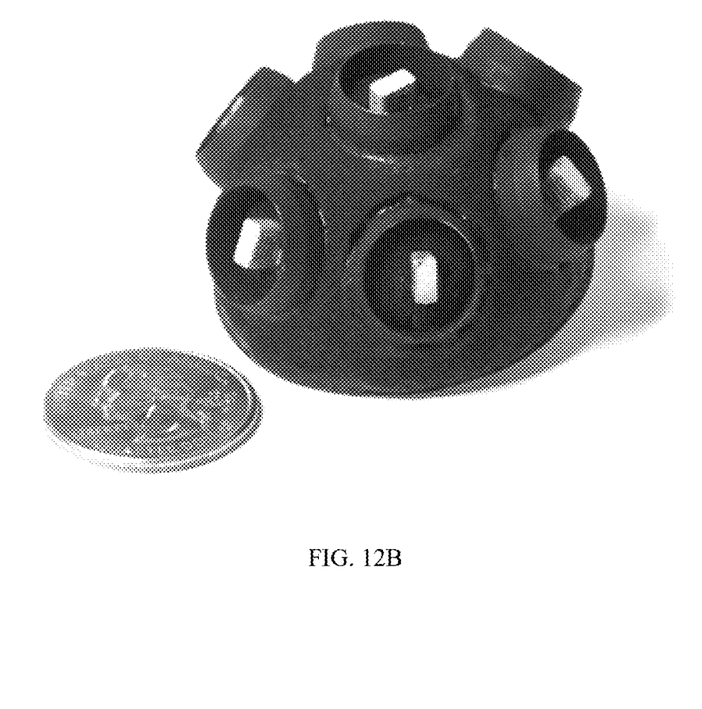

FIG. 12 A, B shows models of a monopulse set of receiving directional antenna arrays for micro UAS.

REFERENCE NUMBERS

101—UAS
102—space imaging sector, antenna pattern, main beam
103—first overlap antenna pattern in X direction
104—second antenna pattern overlapping in X direction
105—footprint of main beam, space imaging sector
106—footprint of first overlap antenna pattern in X direction
107—footprint of second overlap antenna pattern in X direction
108—footprint of first overlap antenna pattern in Y direction
109—footprint of second overlap antenna pattern in Y direction
202—antenna pattern, main beam
203—space tilted antenna pattern
204—antenna pattern in polar coordinates
205—object position close to the center of the antenna pattern
206—object position tilted relative to the center of the antenna pattern
207—phase shift
208—amplitude change corresponding to phase shift
209—amplitude change corresponding to phase shift for tilted relative to the center antenna pattern
301—two-axis directional antenna array
401—three-axis directional antenna array
501—directional antennas with overlapping antenna patterns distributed around UAS
601—monopulse transceiver modules distributed around UAS
701—directional antennas with overlap antenna patterns distributed between a swarm of UAS
801—monopulse transceiver module
802—monopulse processor
803—transmitter
804—power amplifier
805—transmitting antenna
806—covered imaging space sector
807—overlap antenna patterns
808—X-axis receiver chains
809—Y-axis receiver chains
810—low noise amplifier
811—directional coupler
812—analog-to-digital converter
813—analog-to-digital converter
814—image generator
815—multi-channel processor
816—synchronization means
817—output chain
818—digital interface Operation Fast monopulse high-resolution imaging is provided by a non-scanning quadrature or multidirectional positioned array of directional antennas with overlapping antenna patterns. Antennas can be distributed around the perimeter of UAS or between swarms of UAS. Monopulse directional antenna arrays can be arranged as non-scanning transceiver modules illuminating imaging space sectors. Each transceiver module covering one said space sector. Reflected signals are simultaneously received from all objects within h imaging space sector by a set of directional antennas with overlapping antenna patterns distributed in quadrature or multi-axis directions. Processing of received by directional antenna signals is simultaneously providing by a monopulse processor and a multi-channel digital processor, wherein each receiving antenna is coupled to a separate receiver chain.

The time of signal processing is significantly decreased because signals from all imaging areas are processed simultaneously [Claim 1], even compared to holographic radar, where receiving signals are processed digitally by switching virtual beamforming receiving signals. For example, a scanning radar typically processes only one beam at a time, holographic staring radar processes signals by switching virtual beams, and monopulse imaging radar processes all beams simultaneously.

Also, holographic radar transmits more powerful signals, since a scanning radar contains a high gain antenna on both transmit and receive and monopulse radar transmits power spreading inside the imaging space sector. From the side, high gain antennas in monopulse radar provide better gain and sensitivity than holographic radar, where usually applied an array of omnidirectional antennas, which need to provide a wide area of observation for each antenna array element, and virtual set of receiving signals antennas activated for very short time for one separate point of image (pixel). Practically monopulse imaging radar will provide the same gain and sensitivity of antennas, as scanning radar with similar directional antenna.

Monopulse systems can be continuous waves or pulsed [3]. Presented below is an estimation made for a continuous observation pulsed radar with a wide field of view, where it was estimated how the distribution of transmitting power will affect radar range. The maximum range equation for a monostatic scanning radar is given by the following equation [3]:

$$R = \left[ \frac{P_t G_t G_r \sigma \lambda^2 F_t^2 F_r^2}{(4\pi)^3 P_r} \right]^{\frac{1}{4}}, \quad (1)$$

where: R—radar-to-target range; σ—radar target cross-section; λ—wavelength; Pr≤received-signal power being equal to the receiver minimum detectable signal Smin; Pt—transmitted-signal power (at antenna terminals); Gt—transmitting antenna power gain; Gr—receiving antenna power gain; Ft—pattern propagation factor for transmitting antenna-to-target path; Fr—pattern propagation factor for target-to-receiving antenna path. The maximum range for a radar when the antenna beam width is, for example, 10 times wider (beam width increased from 3 to 30 degrees). For the same transmitted power, Pt, the energy of the transmitted signal spreads over a 10×10 square, and the signal reaching the target (according to the inverse square law) is decreased 100-fold. A radar with a phase antenna array, or holographic radar with virtual switching receiving beams, can scan the entire area of observation and receive 1 pixel hit by a pulse every second because one pulse hits the pixel per scan. For imaging radar term pixel will be used instead of term target. For a continuous observation monopulse radar, pulses may be transmitted and reflected from all image pixels continuously. This means that a continuous observation radar can transmit to and receive many more pulses per second for any one-pixel direction and all image pixels will be hit and processed simultaneously. Integration of these received pulses will dramatically increase information about all image pixels, or objects.

The maximum range equation for a continuous observation monopulse imaging radar must include the number of integrated pulses:

$$R = \left[\frac{P_t I_e M \ G_t G_r \sigma \lambda^2 F_t^2 F_r^2}{(4\pi)^3 P_r}\right]^{\frac{1}{4}}, \qquad (2)$$

where: $I_e$—integrator efficiency; M—number of transmitted/received pulses per period of integration.

In continuous wave monopulse imaging radars with continuous imaging space sector observation of the received signals [Claims 2-4], integration leads to increasing radar range. Simultaneous correlation and integration of thousands of signals per second from each pixel (or point of observation) provides not only a larger radar range but can also help increase image resolution and object recognition by using diversity signals, polarization modulation, and intelligent processing. Non-scanning monopulse systems allow a dramatic decrease in transmitting power and at the same time an increase in radar range also by integrating 2-3 orders more signals than regular scanning radar systems. Monopulse radar systems can be passive, using ambient RF energy. The Monopulse method provides better resolution of 2-3 orders than scanning radars. Synchronizing of signals directly in antennas provides high-accuracy amplitude and phase measurement [Claims 5-7].

The non-scanning antenna array is phase/frequency independent and can be multi-frequency, multi-function. All receiving chains using the ratio of amplitudes, phases, and relative frequency components to shift signals for multi-axis signal processing. Multi-axis processed signals from receiving antennas can also be applied for the detection and identification of objects in each separate set of receiving antennas and for generating alarm signals and multi-axis signals proportional to object range, angle of arrival, and velocity. Monopulse means can consist of filters in identification circuits for the separation of clutter signals, target signals from background noise, moving targets, and identification of moving targets. Integration time for receiving signals is controlling depends on the detected target range and speed, where a longer integration time corresponds to a longer range [Claim 8]. A monopulse synthetic aperture radar system can be passive [Claim 9].

The invention claimed is:

1. A monopulse synthetic aperture radar system comprising:
a monopulse synthetic aperture radar for fast, high-resolution imaging of ground and/or airborne objects comprising illuminating transmitting means, receiving means covering an entire space sector by a set of non-scanning antenna beams and processing means for processing reflected signals;
wherein:
transmitting and receiving means are arranged as monopulse transceiver modules wherein each monopulse transceiver module covers at least one said space sector;
each monopulse transceiver module consists of a monopulse processor and at least one transmitter connected to at least one transmitting antenna covering said space sector and a set of non-scanning receiving antennas with overlapping antenna patterns in quadrature or multi-axis directions and covering the same space sector, wherein each receiving antenna is coupled to a separate receiver chain;
each receiver chain is coupled to said monopulse processor for simultaneous multi-axis processing of all signals in receiving chains based on amplitudes, phase and frequency component shifts of signals in said overlapping receiving antennas;
outputs of said monopulse processor and receiver chains are connected to an image generator by a digital interface;
said image generator consists of a quadrature or multi-axis multi-channel processor for simultaneous processing of all signals in receiving chains including amplitude, phase and frequency component shifts of signals in receiving antennas and generating an image including information received from said monopulse processor;
all transmitters, receiver chains, and processing means are connected with synchronization means; and
transceiver modules, image generator and radar output chain are connected by microwave and/or fiber optic digital interface.

2. The monopulse synthetic aperture radar system of claim 1, wherein each monopulse transceiver module consists of a set of non-scanning transmitting and receiving antennas covering the space sector and each of the transmitting antennas is coupled with a receiving antenna and a separate receiver chain.

3. The monopulse synthetic aperture radar system of claim 1, wherein each monopulse transceiver module consists of a set of non-scanning transmitting and receiving antennas covering the space sector and each receiving antenna is arranged for transmitting and receiving signals.

4. The monopulse synthetic aperture radar system of claim 1, wherein each monopulse transceiver module transmits continuous waves, or pulses or pulses forming single sinusoidal waves without or with multi-mode different kinds of modulation.

5. The monopulse synthetic aperture radar system of claim 1, wherein said monopulse transceiver module is positioned on UAS or other airborne or ground carrier or multiple monopulse transceiver modules are distributed around the carrier, or multiple monopulse transceiver modules are distributed between a swarm of carriers connected to a radar communication network.

6. The monopulse synthetic aperture radar system of claim 1, wherein said transmitting, receiving and processing means are arranged for simultaneous transmitting, receiving, and processing of signals on a few different frequencies (multi-frequency signals) and consist of separate antennas and filters in each receiving and processing chain.

7. The monopulse synthetic aperture radar system of claim 1, wherein said transmitting, receiving, and processing means are arranged for simultaneous transmitting, receiving and processing of different modes, such as communication, navigation, and control (multi-mode signals) and consist of separate antennas, filters, and processing means in each transmitter, receiving and processing chain.

8. The monopulse synthetic aperture radar system of claim 1, wherein one antenna of said set of non-scanning receiving antennas with overlapping antenna patterns is arranged as a reference for monopulse and/or adaptive signal processing for noise suppression and/or time delay adjustment to increase image quality.

9. A monopulse passive synthetic aperture radar system for fast, high-resolution imaging of ground and/or airborne objects comprising illuminating transmitting means, receiving means covering an entire space sector by a set of non-scanning antenna beams and processing means for processing reflected signals;
wherein:
   at least one ambient cooperative or non-cooperative source of radio-frequency and/or microwave signals serves as said transmitting means for illuminating said entire space sector;
   said receiving means are arranged as monopulse receiver modules consisting of a set of non-scanning receiving antennas with overlapping antenna patterns in quadrature or multi-axis directions and covering the entire space sector, wherein each receiving antenna is coupled to a monopulse processor for simultaneous multi-axis processing of all signals in receiving chains based on amplitudes, phase and frequency component shifts of signals in said overlapping receiving antennas;
   each receiver chain consists of an analog-to-digital converter and is coupled to said image generator by a digital interface;
   said image generator consists of a quadrature or multi-axis multi-channel processor for simultaneous processing of all signals in receiving chains including amplitude, phase and frequency component shifts of signals in receiving antennas and generating an image including information received from said monopulse processor;
   all receiver chains and processing means are connected with synchronization means; and receiving means, said image generator and radar output chain are reconnected by microwave and/or fiber optic digital interface;
   wherein said system performs multi-axis processing of all signals in receiving chains based on amplitudes, phase and frequency component shifts of signals in said overlapping receiving antennas, with each receiving antenna coupled to a separate receiver chain.

\* \* \* \* \*